Figure 1:
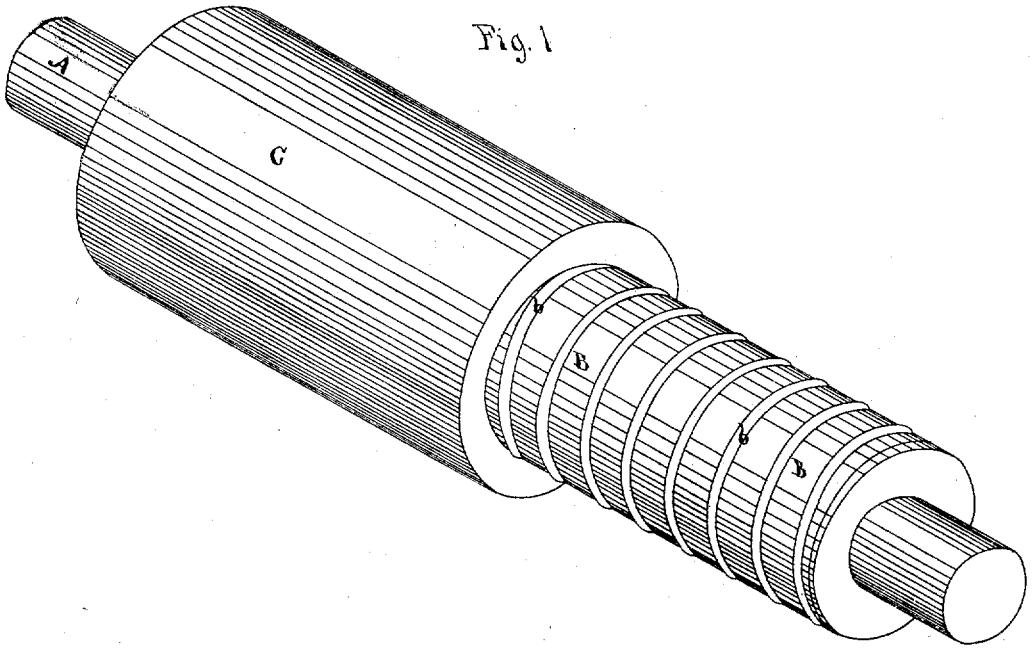
Figure 2:
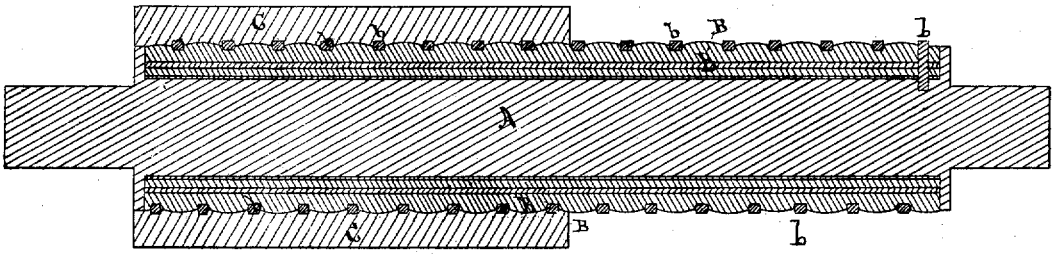
Figure 3:
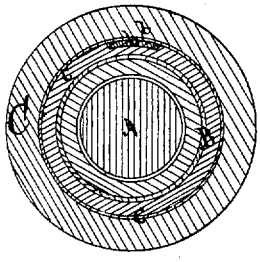

J. B. FORSYTH.

Improvement in the Manufacture of Elastic-Rolls.

No. 5,081. Reissued Oct. 1, 1872.

Witnesses
J. B. Sanford
Henry W. Holland

Inventor
James B. Forsyth
by J. E. Maynadier
his Atty

AM. PHOTO-LITHOGRAPHIC CO. N.Y. (OSBORNE'S PROCESS.)

UNITED STATES PATENT OFFICE.

JAMES B. FORSYTH, OF BOSTON, MASSACHUSETTS.

IMPROVEMENT IN THE MANUFACTURE OF ELASTIC ROLLS.

Specification forming part of Letters Patent No. 101,994, dated April 19, 1870; reissue No. 5,081, dated October 1, 1872.

*To all whom it may concern:*

Be it known that I, JAMES B. FORSYTH, of Boston, in the county of Suffolk and State of Massachusetts, have invented a certain Improvement in the Manufacture of Elastic Rolls, of which the following is a specification:

My present invention is an improvement upon that described in my Patent No. 59,580, (reissued January 31, 1871, and now numbered 4,244,) and consists in binding the semi-elastic interior portion of the roll to the shaft, as an additional precaution against the turning of the body of the roll upon its shaft. A minor feature of my invention consists in roughening the shaft by the use of a metallic cement which will harden and produce inequalities in the surface of the shaft.

In the drawing, A is the shaft, which is coated with metallic cement, the cement being applied so that its surface is rough. After the cement has properly set the shaft is ready for use. The well-known metallic cement commonly composed of metal filings, sal ammoniac, and sulphur, is well adapted for this purpose, as, when made semi-liquid, it can readily be applied with a brush, so that its outer surface will be quite rough, and when set it will become hard and adhere very firmly to the metal shaft. I find, however, that the cement is improved for my purpose by adding to it a small quantity of rubber. The best results are produced by a cement composed of rubber, one ounce; iron filings, one pound; sal ammoniac, two ounces; and sulphur, one ounce; naphtha being used in order to dissolve the rubber and reduce the cement to a semi-liquid state. In practice I usually coat the shaft thus prepared with one or more layers of the ordinary rubber cement, although this is not essential. The semi-elastic interior is afterward applied to the shaft in the well-known way. This semi-elastic interior is composed of rubber highly compounded, or of a vulcanizable-rubber compound and fibers, and is the same thing as that described in my patent above referred to. The main feature of my present invention, as before stated, consists in the use of a binding over the semi-elastic material, in order that when the binding is secured to the shaft, so that it cannot slip upon the shaft, it will be impossible for the semi-elastic interior to slip upon the shaft; and as the nature of the semi-elastic interior is such that the elastic exterior when vulcanized becomes practically one body with it, the roll is composed of one solid piece of vulcanized rubber secured to the shaft as firmly as the binding is secured to the shaft, and, therefore, it is impossible for the body of the roll to slip upon the shaft, unless the binding cuts or breaks through the rubber between it and the shaft; but as the rubber which lies between the binding and the shaft is tougher and stronger than the rest of the body, the roll is very much more durable than any roll which is sufficiently elastic and made of the same material throughout, the interior of which is bound to its shaft, as the rubber which lies between the binding and the shaft of the latter is much more readily broken or cut through by the binding than the semi-elastic interior lying between the binding and the shaft in my roll above described. In the drawing, *b* is a wire wound spirally upon the semi-elastic interior, and fastened at each end to the shaft. After the semi-elastic interior is applied to and bound upon the shaft, the elastic exterior is applied, a coat of cement being first laid upon the interior, and the whole vulcanized in the usual way. I sometimes make the semi-elastic interior much thinner in proportion than shown in the drawing, and fill up the space between it and the elastic covering with rubber and fibers, so arranged that the fibers will radiate from the center, as fully described in Letters Patent of the United States No. 59,798, granted to me on the 20th day of November, A. D. 1866, (reissued January 31st, 1871, and now numbered 4,243.) When the binding is of small-sized wire, as shown in the drawing, it is very important that fibers be ground up with the compound for the interior, as thereby the small wire is more effectually prevented from cutting or breaking through the rubber between it and the shaft. Duck or other suitable material may be used with either the semi-elastic interior or the elastic exterior; but this is not desirable in small rolls.

What I claim as my invention is—

1. An elastic roll, the interior of which is composed of semi-elastic material, secured to its shaft by a binding, substantially as set forth.

2. The mode of preparing the shafts of elastic rolls by coating them with metallic cement, as described.

3. The above-described cement composed of the ingredients, including rubber and a proper solvent, and mixed in about the proportions, as set forth.

JAMES B. FORSYTH.

Witnesses:

GEORGE C. FITZ,

J. E. MAYNADIER.